United States Patent [19]
Wakimoto et al.

[11] Patent Number: 4,867,545
[45] Date of Patent: Sep. 19, 1989

[54] TELECENTRIC IMAGE-FORMING SYSTEM HAVING VARIBLE MAGNIFICATIONS

[75] Inventors: Zenji Wakimoto; Takahisa Hayashi, both of Kyoto, Japan

[73] Assignee: Dainippon Screen Mfg. Co., Ltd., Japan

[21] Appl. No.: 208,379

[22] Filed: Jun. 17, 1988

[30] Foreign Application Priority Data

Jun. 19, 1987 [JP] Japan .................... 62-153803

[51] Int. Cl.$^4$ .................. G02B 13/22; G02B 11/18
[52] U.S. Cl. .................... 350/415; 350/427
[58] Field of Search ................. 350/415, 427

[56] References Cited

U.S. PATENT DOCUMENTS 4,386,828 6/1983 Hirose ..................... 350/427

Primary Examiner—Bruce Y. Arnold
Assistant Examiner—Rebecca D. Gass
Attorney, Agent, or Firm—Ostrolenk, Faber, Gerb & Soffen

[57] ABSTRACT

The image-forming magnification of a telecentric optical system, for use in an exposure apparatus such as a projecting apparatus, a laser plotter and the like is determined by the focal length ratio. An error in processing and arranging lenses necessitates adjustment of the image-forming magnification. According to the present invention, the magnification may be greatly varied. According to the present invention, a lens movable along the optical axis and having a positive focal length is placed at a position corresponding to the point at which the focal points of two lens groups coincide with each other. The image-forming magnification ratio can be varied by moving the lens while the distance between an object and an image is kept constant. Characteristic features of telecentric optical systems are maintained.

13 Claims, 11 Drawing Sheets

TELECENTRIC IMAGE-FORMING SYSTEM HAVING VARIBLE MAGNIFICATIONS

BACKGROUND OF THE INVENTION

The present invention relates to a telecentric image-forming optical system through which a principal ray passes parallel to an optical axis, and more particularly to a telecentric image-forming optical system capable of changing image-forming magnifications.

The telecentric image-forming optical system in accordance with the present invention can be utilized within a measuring projector and within an optical measuring instrument. It can also be utilized as an image-forming optical system within exposure apparatus such as a color scanner, a laser plotter and the like.

A lens system in which the secondary focal point of an objective lens having a positive focal length coincides with the primary focal point of an eyepiece having a positive focal length is known as a telescopic system. When an object is placed in the vicinity of the primary focal point of the object lens of the telescopic system, an inverted image is formed in the vicinity of the secondary focal point of the eyepiece to form a telecentric image-forming optical system through which a principal ray passes parallel to an optical axis.

In this case, the magnification of a real image with respect to the object is the ratio of the focal length of the eyepiece to the focal length of the objective lens, and the magnification is not varied when the object distance is varied. This is the characteristic feature of the foregoing lens system. Utilizing this feature, a telecentric image-forming optical system is frequently used as an optical system within a measuring instrument which requires an accurate measurement of a dimension as disclosed in Japanese Patent Laid-Open Publication (Kokai) No. 51-96336.

To take advantage of the characteristic feature of the telecentric image-forming optical system (i.e., that a principal ray passes therethrough parallel to an optical axis), the system may be utilized as a relay lens to reconstruct an image, formed by a lens system placed forward, as an object of the lens system placed backward. For example, U.S. patent application Ser. No. 33,582 (filed on Apr. 1, 1987) now U.S. Pat. No. 4,810,068 discloses art in which a two-step telecentric optical system is used within a laser exposure apparatus, and in particular, within a laser plotter.

The image formation magnification of such a telecentric image-forming optical system is kept constant even if an object distance is varied. The magnification of such a system is determined only by the combination of focal lengths of lenses used therewithin.

The above-described optical system presents a problem inasmuch as if the dimension of a lens or a lens group is not processed as designed for a lens or a lens group is erroneously arranged or adjusted during assembly, then the image-forming magnification of the system is different from that intended. It has been difficult to correct such an error. Further, it has been very difficult to vary the magnification of such a system by more than twofold without degrading the quality of a formed image below a certain level while keeping the distance between the object and the image unchanged and the principal ray traveling parallel to an optical axis. Conventionally, it has been possible to vary a magnification no more than twofold, for example up to 1.5 or 1.8 times (as disclosed in U.S. patent application Ser. No. 33,582). However, in a laser plotter, art work can be carried out very effectively only if the reproduction accuracy is variable by more than twofold (depending on the nature of the product). Therefore, the provision of a telecentric image-forming optical system capable of varying magnification more than twofold without degrading the quality of a formed image has been desired.

SUMMARY OF THE INVENTION

The present invention was made to solve the abovedescribed problems and has for its essential object to provide a telecentric image-forming optical system which enables the correction of an image-forming magnification, whereby an error which has occurred in processing a lens is compensated.

It is a second object of the present invention to provide a telecentric image-forming optical system capable of varying its magnification more than twofold with satisfactory image-forming magnification performance.

The aforementioned objects are accomplished by the present invention, with a telecentric image-forming optical system, which includes a first lens group having a positive focal length $f_1$, a second lens group having a positive focal length $f_2$, and a third lens group having a positive focal length $f_3$ with the lens groups being arranged in order along an optical axis with the second group located between the first and third groups, wherein the third lens group is so disposed that the principal focal point thereof substantially coincides with the secondary focal point of the first lens group; the focal length of the second lens group is selected to satisfy the conditions:

$f_1/2 < f_2$; and $f_3/2 < f_2$, and the second lens group being movable along an optical axis and disposed so as to be placed in the vicinity of the position at which both of the focal points substantially coincide with each other; whereby an image-forming magnification of the system can be varied by moving the second lens group along the optical axis with the distance between the object and an image kept substantially constant.

According to the above-described construction, the movement of the second lens group causes the composite focal point of the first lens group and the second lens group to move. In order to maintain the characteristic features of a telecentric optical system, it would be necessary to move the third lens group according to the variation of the movement of the second lens group so that the principal focal point of the third lens group coincides with the composite focal point of the first and second lens groups.

However, if the focal lengths of the respective lens groups are appropriately selected and if the movement of the second lens group is relatively small, the movement of the composite focal point of the first and second lens group can be greatly reduced. Thus the telecentric optical system can satisfactorily perform its function without any movement of the third lens group.

It is necessary to move the second lens group to a great extent to vary the magnification by more than twofold. To this end, at least the third lens group is movable along the optical axis, and the focal length $f_2$ of the second lens group satisfies the following conditions:

$f_2 < 2f_1$; and $f_2 < 2f_3$, and the third lens group is moved so that the principal focal point thereof substantially coincides with the composite secondary focal point of the first and second lens groups which moves according to the movement of the second lens group. Thus, a complete telecentric image-forming optical system is formed. Accordingly, the image-forming magnification of the system will not be varied if an object distance is changed. However, when the object distance is changed, the image position is also changed. Therefore, the distance between the object and the image can be kept constant by appropriately selecting the object distance irrespective of image-forming magnifications. In this case, when the first lens group is further movable from the object position and the object position is taken as a reference position, the image position is not changed to form a complete telecentric zoom image-forming optical system. On the other hand, when the image position is taken as the reference position, the first lens group is not necessarily movable. In this case, the telecentric optical system performs its function by moving as a unit along the optical axis.

Both an object and an image must be disposed outside the optical system, that is, the object must be disposed forward from the first lens group and the image must be disposed backward from the third lens group. Therefore, the focal lengths $f_1$, $f_2$, and $f_3$ of the respective lens groups must satisfy at least the following conditions:

$f_1/2 < f_2$; and $f_3/2 < f_2$

If the focal length $f_2$ is small in comparison with the focal lengths $f_1$ and $f_3$, the curvature of field becomes too great and the dimension of an effective image plane is restricted. Increasing the focal length $f_2$ improves the extent of the flatness of an image plane and increases the dimension of the effective image plane. However, if the focal length $f_2$ is too long compared to the focal lengths $f_1$ and $f_3$, image-forming magnification will not vary even though the second lens group is moved close to the first lens group or the third lens group. Accordingly, it is necessary that the focal length $f_2$ satisfy the following conditions:

$f_2 < 2f_1$; and $f_2 < 2f_3$ in increasing the focal length $f_2$ so that the telecentric image-forming optical system has a magnification more than twofold in consideration of aberration and the dimension of the image plane.

To summarize, in the preferred embodiments described above, the following conditions are satisfied $f_1/2 < f_2 < 2f_1$; and $f_3/2 < f_2 < 2f_3$ If only a fine adjustment of image-forming magnification is necessary, the following conditions need not be satisfied:

$f_2 < 2f_1$; and $f_2 < 2f_3$

BRIEF DESCRIPTION OF THE DRAWINGS

FIG. 13-(B) through 13-(D) are explanatory views of lens constructions showing an exemplary application of the present invention.

DETAILED DESCRIPTION OF THE INVENTION

Figure 1:
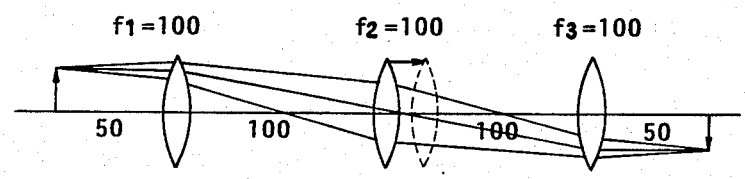
FIG. 1 is a diagrammatic view illustrating the principle of the telecentric image-forming optical system in accordance with the present invention.

FIG. 1 is a schematic diagram for describing the principle of a telecentric image-forming optical system, in accordance with the present invention. As shown in FIG. 1, the focal lengths of first, second, and third lenses are 100 units and the intervals therebetween are 100 units, respectively. Assuming that an object is placed 50 units in front of forward from the first lens, an image is formed 50 units behind backward from the third lens and the magnification of the image is 1.

When the second lens is moved 10 units backward (toward the third lens) along the optical axis, the position of the composite secondary focal point of the first and second lens is moved 1.1 units toward the first lens. Accordingly, it is necessary to move the third lens 1.1 units forward to maintain a complete telecentric optical system. However, since the movement amount thereof is only 1% of the focal length of the third lens, this optical system can, as a practical matter, be used as a telecentric optical system without moving the third lens. When the position of the object is not changed, the image position moves 0.226 units backward, which value is approximately the same as the degree of aberration of the lens. Thus, the amount of movement may be ignored for certain lens aperture ratios.

In this case, the composite focal length of the first and second lenses is 111.1 units and the magnification of the image is 0.9.

In contrast to the foregoing, when the second lens is moved 10 units forward (toward the first lens) along the optical axis from the position shown in solid line in FIG. 1, the synthetic focal length of the first and second lenses is 90.909 units and the magnification of the formed image is 1.1. That is, the magnification ratio of the optical system becomes 1.22 by the forward and backward movements of the second lens.

All the first, second, and third lenses used in this embodiment are thin single lenses in order to simplify the drawings and description made above, but in practice, a plurality of lenses are used to construct the first lens group, the second lens group and the third lens group.

Figure 2:
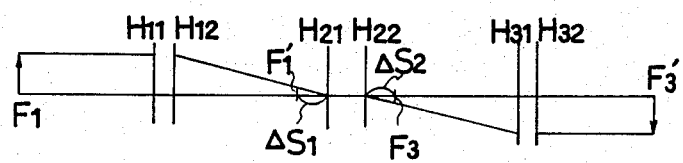
FIG. 2 is a diagrammatic view in consideration of the spherical aberration of the telecentric image-forming optical system in accordance with the present invention.

Therefore, it is necessary to consider the principal points thereof. Referring to FIG. 2, the first lens group (principal points thereof are H11 and H12) and the third lens group (principal points thereof are H31 and H32) exhibit a spherical aberration, light entering the telecentric system parallel to the optical axis does not pass through the focal point. Therefore, it is necessary that the position obtained by adding the spherical aberration amount ΔS (ΔS1, ΔS2) to the focal point coincides with the principal points H21 and H22 of the second lens group. The spherical aberration amount ΔS is positive or negative depending on the structure of the first lens group and third lens group.

In the following embodiments, the dislocation of the principal points of the second lens group is considered. Thus, the optical system to be described hereinafter form telecentric image-forming optical systems.

First Embodiment

Figure 3:
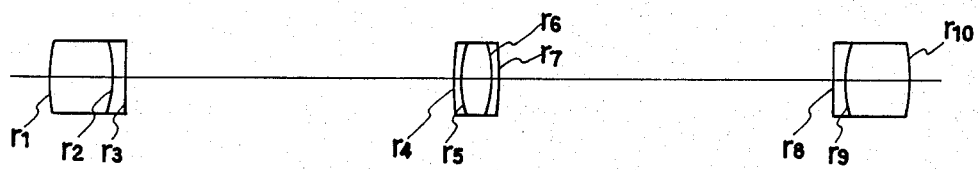
FIG. 3 is a lens construction view showing a first embodiment of the telecentric image-forming optical system in accordance with the present invention.

The first embodiment shows an example of a telecentric image-forming optical system which allows for adjustment of the above-described image-forming magnification. Lens data of the respectively lens groups shown in FIG. 3 are listed in TABLE 1.

TABLE 1

|  | r | d | n | ν |
|---|---|---|---|---|
| (First Group) | | | | |
| 1 | 42.40 | 16.0 | 1.564 | 60.8 |
| 2 | −24.80 | 3.2 | 1.744 | 45.1 |
| 3 | −232.00 | variable | | |
| (Second Group) | | | | |
| 4 | 92.80 | 1.6 | 1.670 | 47.1 |
| 5 | 24.80 | 8.0 | 1.623 | 58.2 |
| 6 | −24.80 | 1.6 | 1.670 | 47.1 |
| 7 | −92.80 | variable | | |
| (Third Group) | | | | |
| 8 | 232.00 | 3.2 | 1.744 | 45.1 |
| 9 | 24.80 | 16.0 | 1.564 | 60.8 |
| 10 | −42.40 | | | |

$f_1$: 102.55; $f_2$: 95.61; $f_3$: 102.55
NA: 0.068
Image size: 9 φ
Distance between object and image in the reference magnification of 1.00 is: 319.52

The arrangement of the respective lenses corresponding to image-forming magnifications of 1.11, 1.00 and 0.9 in this embodiment are shown in TABLE 2.

TABLE 2

| $d_0$ | $d_3$ | $d_7$ | $d_{10}$ | magnification |
|---|---|---|---|---|
| 51.16 | 73.8 | 93.8 | 51.49 | 1.11 |
| 51.16 | 83.8 | 83.8 | 51.16 | 1.00 |
| 51.16 | 93.8 | 73.8 | 51.43 | 0.90 |

Where
r represents the radius of curvature of the faces of the respective lenses;
d shows the distance between the adjacent faces of the lenses;
n denotes the refractive index of the respective lenses relative to the wavelength of 587.6 nm;
ν represents the Abbe number of the respective lenses; and
f is the composite focal length of the respective lens groups.

Figure 4A:
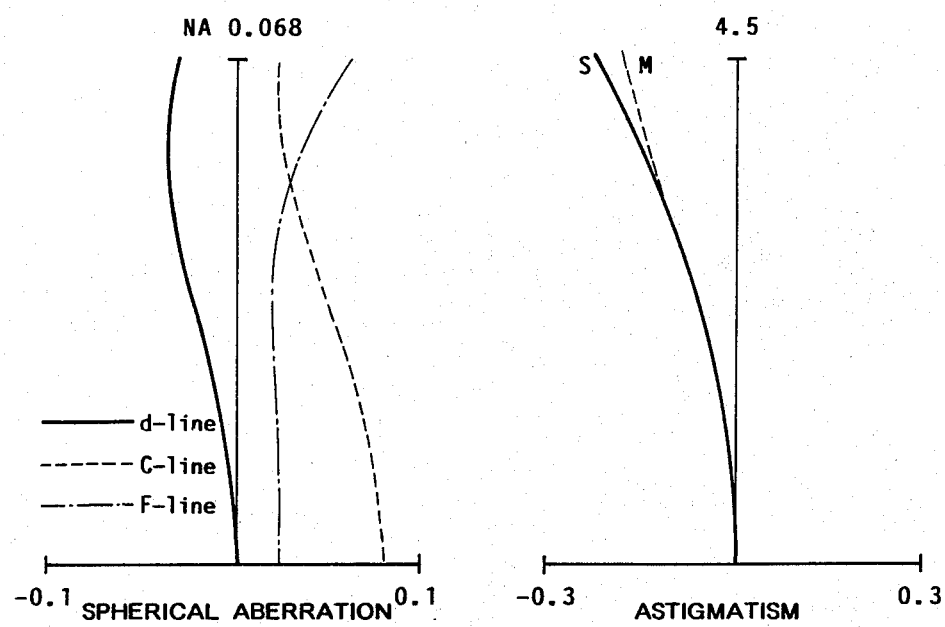
FIGS. 4-(A) through 4-(C) are aberration curves resulting from changes of image-forming modifications in the first embodiment.
Figure 4B:
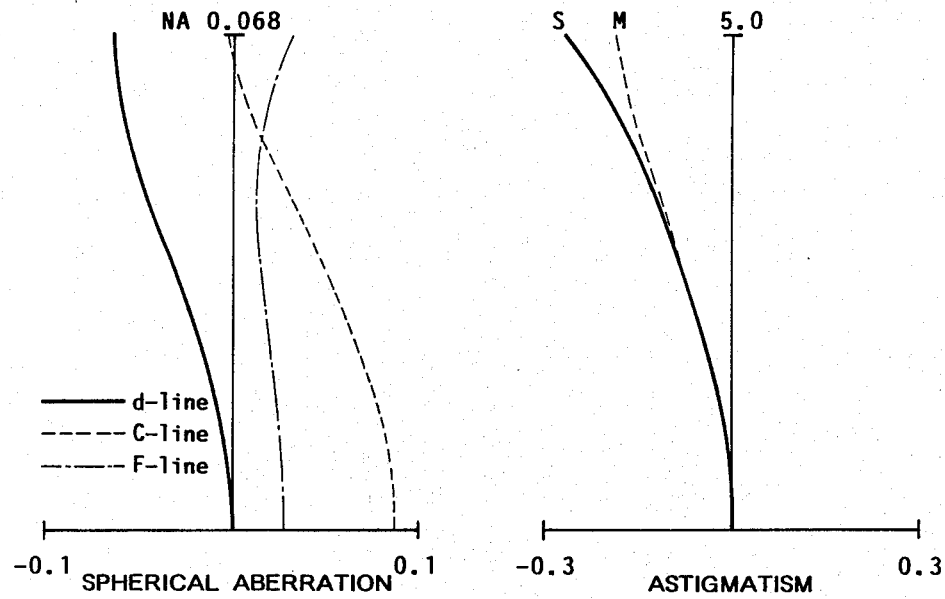
Figure 4C:
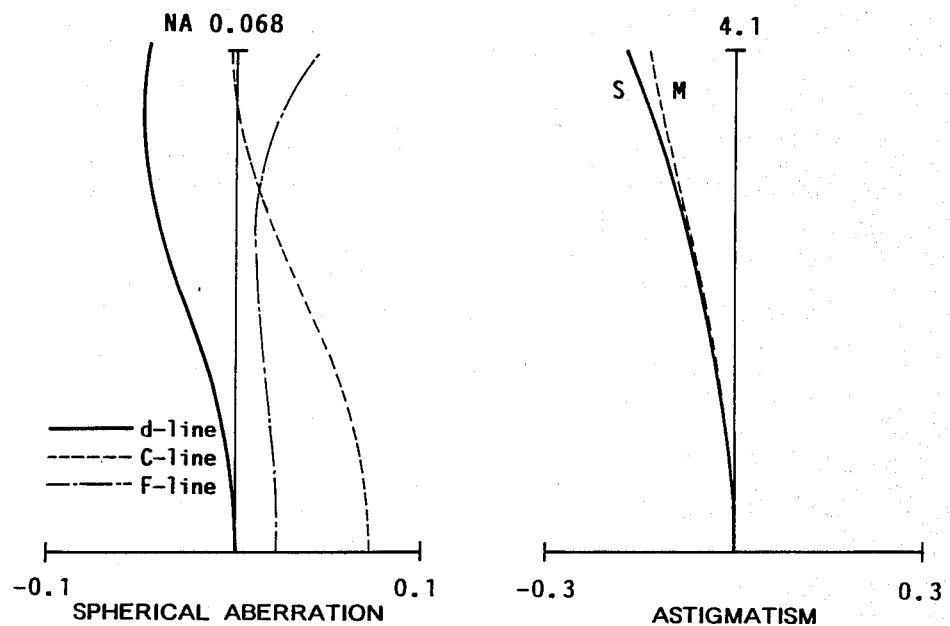

FIGS. 4(A)–4(C) are aberration curves showing the spherical aberration and the astigmatism, respectively, obtained when the reference magnification is 1.00 and the second lens group is moved 10 forward and backward in the first embodiment, with the result that the image-forming magnifications become 1.11 and 0.90. The origin is at the image distance $d_{10}$ as described above.

There is no problem in practical use if the image distance $d_{10}$ is fixed at 51.16, but it is preferable either that the third lens group is moved slightly or that the image surface is moved less than that of the third lens group.

Second Embodiment

Figure 5:
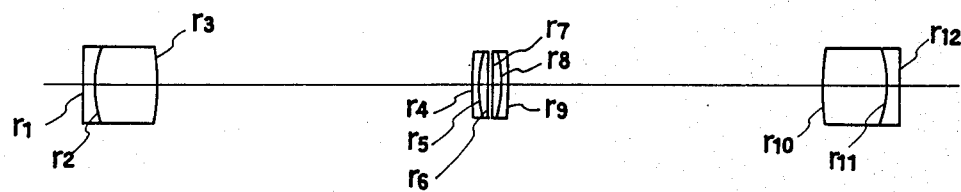
FIG. 5 is a lens construction showing a second embodiment.

In the second embodiment shown in FIG. 5, the telecentric characteristic and the movement of the respective focal points must be considered when the lens system is bright. In this embodiment, the second lens group includes two separable sub-groups. When the second lens group, the interval between the two sub-groups is varied, whereby the telecentric characteristic is maintained and the image position is not changed with the first and third lens groups fixed.

TABLE 3

|  | r | d | n | ν |
|---|---|---|---|---|
| (First Group) | | | | |
| 1 | 1180.00 | 4.0 | 1.728 | 28.3 |
| 2 | 38.00 | 20.0 | 1.670 | 47.1 |
| 3 | −64.00 | variable | | |
| (Second Group) | | | | |
| 4 | 115.00 | 2.0 | 1.670 | 40.4 |
| 5 | 37.80 | 3.0 | 1.569 | 56.0 |
| 6 | ∞ | variable | | |
| 7 | ∞ | 3.0 | 1.569 | 56.0 |
| 8 | −37.80 | 2.0 | 1.607 | 40.4 |
| 9 | −115.00 | variable | | |
| (Third Group) | | | | |
| 10 | 64.00 | 20.0 | 1.607 | 47.1 |
| 11 | −38.00 | 4.0 | 1.728 | 28.3 |
| 12 | −1180.00 | | | |

$f_1$: 103.56; $f_2$ (reference magnification 1.00): 119.10; $f_3$: 103.56;
NA: 0.08;
dimension of image plane: 12 φ;
distance between object and image: 346.20;

The arrangements of the respective lenses with respect to image-forming magnification of 1.11, 1.00, and 0.91 are shown in TABLE 4.

TABLE 4

| $d_0$ | $d_3$ | $d_6$ | $d_9$ | $d_{12}$ | magnification |
|---|---|---|---|---|---|
| 43.50 | 89.1 | 0.1 | 112.0 | 43.50 | 1.11 |
| 43.50 | 100.0 | 1.2 | 100.0 | 43.50 | 1.00 |
| 43.50 | 112.0 | 0.1 | 89.1 | 43.50 | 0.91 |

Figure 6A:
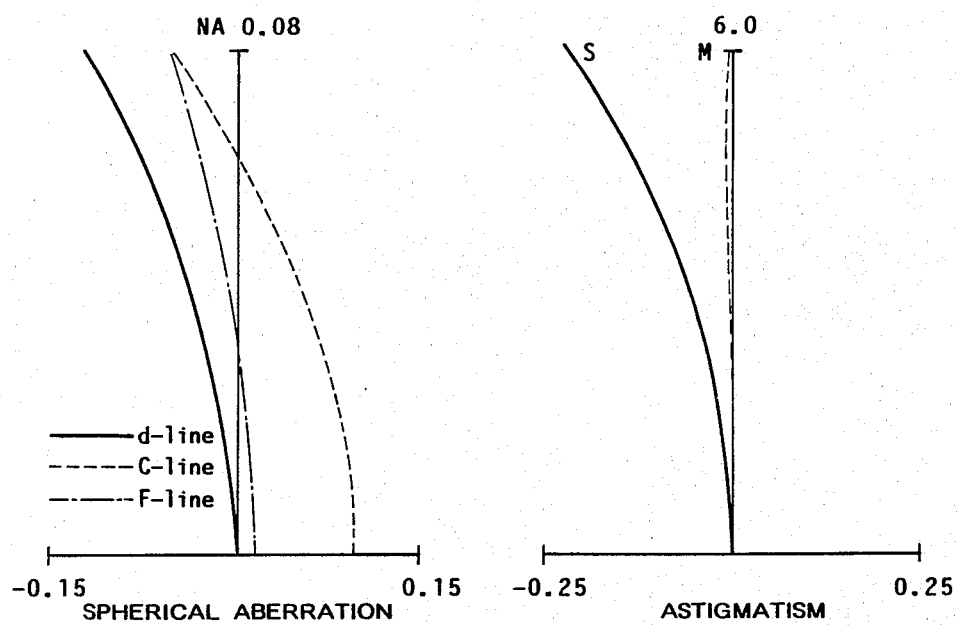
FIGS. 6-(A) through 6-(C) are aberration curves resulting from changes of image-forming magnifications in the second embodiment.
Figure 6B:
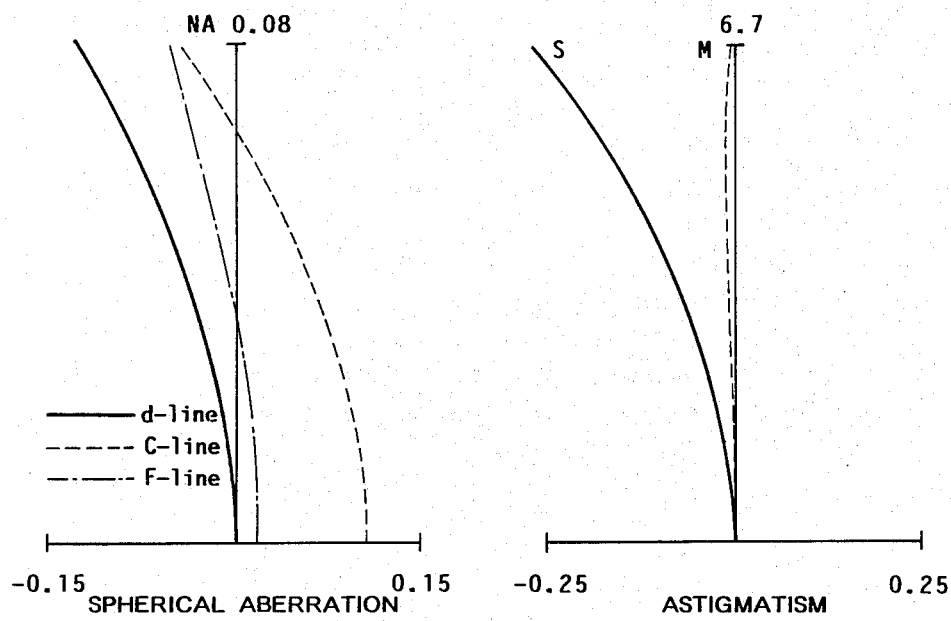
Figure 6C:
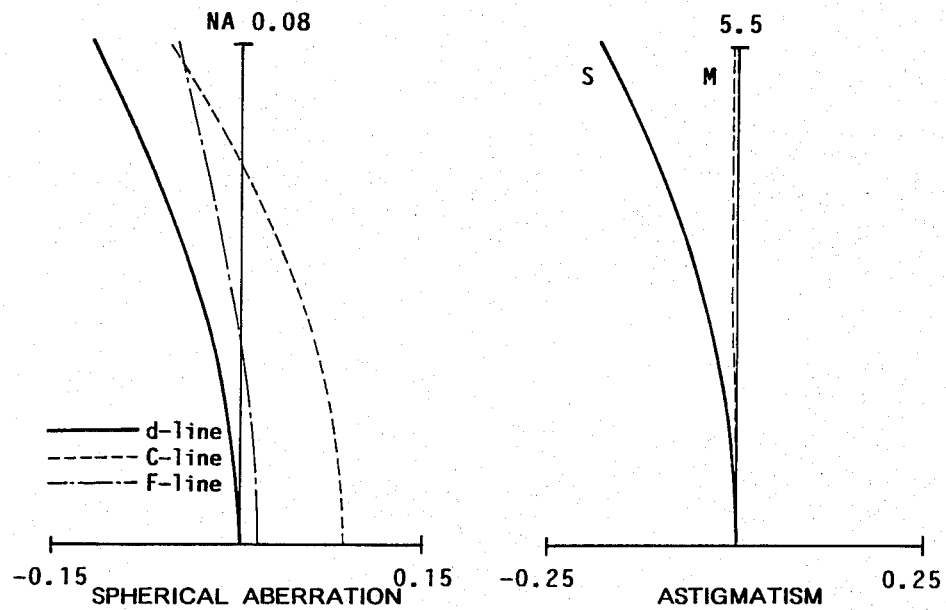

FIGS. 6(A)–6(C) are aberration curves showing the spherical aberration and astigmatism, respectively, with image-forming magnifications of 1.00, 1.11 and 0.91 obtained by changing the interval between the faces of curvatures $r_6$ and $r_7$ of the second lens group with the movement of the second lens group.

In this embodiment, since the second group is separable, the image distance $d_{12}$ can be fixed with the third lens group fixed.

Third Embodiment

Figure 7:
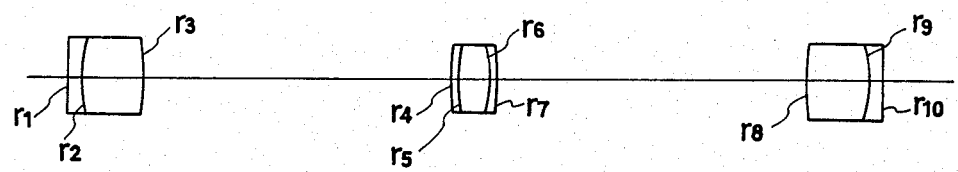
FIG. 7 is a lens construction showing a third embodiment.

In the third embodiment shown in FIG. 7, the second lens group is moved in a great amount so as to greatly change the image-forming magnification of the telecentric image-forming optical system. In this case, the variation of the composite focal point of the first lens groups and the second lens group becomes great. Accordingly, the third lens group is moved according to the movement of the composite focal point so that the primary focal point of the third lens coincides with the composite focal point.

In this case, the optical system forms a complete image-forming optical system. Consequently, even though the object distance is moved, the image-forming magnification previously set does not vary.

TABLE 5

| | r | d | n | ν |
|---|---|---|---|---|
| (First Group) | | | | |
| 1 | 1180.00 | 4.0 | 1.728 | 28.3 |
| 2 | 38.00 | 20.0 | 1.670 | 47.1 |
| 3 | −64.00 | variable | | |
| (Second Group) | | | | |
| 4 | 115.00 | 2.0 | 1.607 | 40.4 |
| 5 | 37.80 | 10.0 | 1.569 | 56.0 |
| 6 | −37.80 | 2.0 | 1.607 | 40.4 |
| 7 | −115.00 | variable | | |
| (Third Group) | | | | |
| 8 | 64.00 | 20.0 | 1.607 | 47.1 |
| 9 | −38.00 | 4.0 | 1.728 | 28.3 |
| 10 | −1180.00 | | | |

$f_1$: 103.56; $f_2$: 119.45; $f_3$: 103.56;
NA: 0.08;
dimension of image plane: 8 $\phi$;
distance between object and image: 345.74

The arrangements of the respective lenses corresponding to image-forming magnifications of 1.73, 1.00 and 0.58 in this embodiment are shown in TABLE 6.

TABLE 6

| $d_0$ | $d_3$ | $d_7$ | $d_{10}$ | magnification |
|---|---|---|---|---|
| 37.50 | 13.0 | 148.0 | 85.25 | 1.73 |
| 43.87 | 98.0 | 98.0 | 43.87 | 1.00 |
| 85.25 | 148.0 | 13.0 | 37.50 | 0.58 |

Figure 8A:
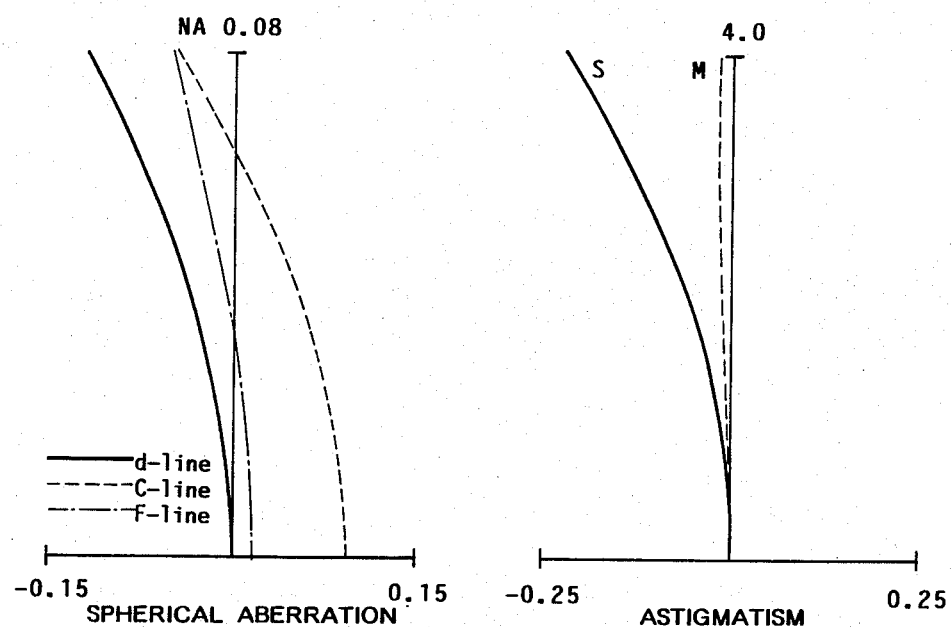
FIGS. 8-(A) through 8-(C) are aberration curves resulting from changes of image-forming magnifications in the third embodiment.
Figure 8B:
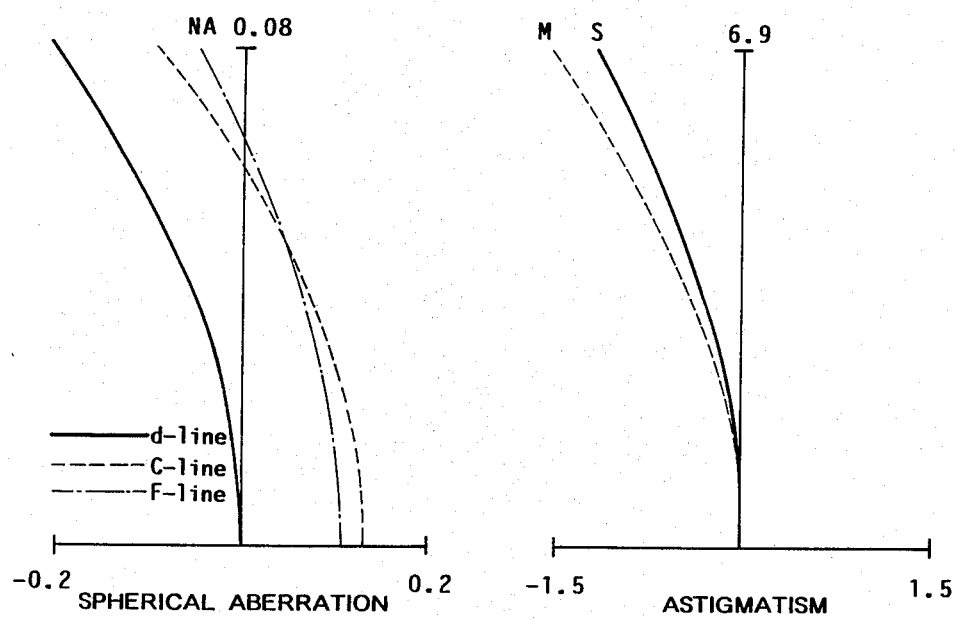
Figure 8C:
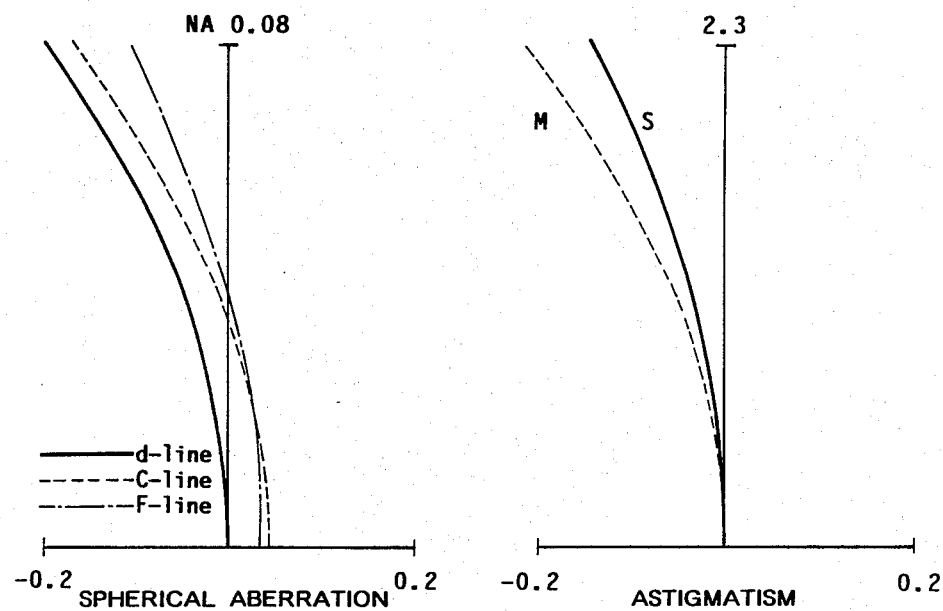

FIGS. 8(A)–8(C) show aberration curves showing the spherical aberration and astigmatism, respectively, with image-forming magnifications of 1.00, 1.73 and 0.58.

In this embodiment, the magnification ratio of the formed image is 1.73/0.58, namely, 2.98. Magnification of more than two is possible without degrading image-forming performance.

Fourth Embodiment

Figure 9:
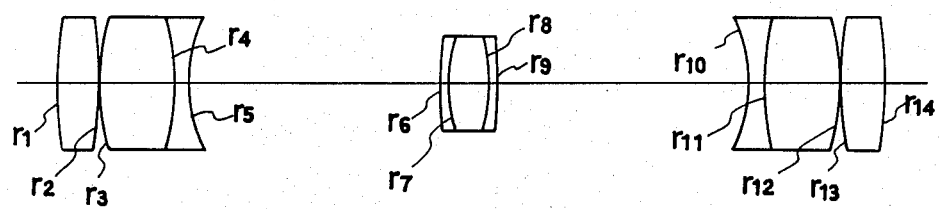
FIG. 9 is a lens construction showing a fourth embodiment.

The fourth embodiment shown in FIG. 9 includes, similarly to the third embodiment, a telecentric image-forming optical system, capable of forming an image at a relatively great magnification, in which a first lens group and a third lens group each consist of three lenses. Lens data of the respective lens groups shown in FIG. 9 are listed in TABLE 7.

TABLE 7

| | r | d | n | ν |
|---|---|---|---|---|
| (First Group) | | | | |
| 1 | 103.60 | 10.0 | 1.734 | 51.1 |
| 2 | −154.00 | 0.4 | | |
| 3 | 51.00 | 18.0 | 1.620 | 49.8 |
| 4 | −60.00 | 4.0 | 1.750 | 35.2 |
| 5 | 40.60 | variable | | |
| (Second Group) | | | | |
| 6 | 109.00 | 2.0 | 1.624 | 47.1 |
| 7 | 38.00 | 10.0 | 1.589 | 61.2 |
| 8 | −38.00 | 2.0 | 1.624 | 47.1 |
| 9 | −109.00 | variable | | |
| (Third Group) | | | | |
| 10 | −40.60 | 4.0 | 1.750 | 35.2 |
| 11 | 60.00 | 18.0 | 1.620 | 49.8 |
| 12 | −51.00 | 0.4 | | |
| 13 | 154.00 | 10.0 | 1.734 | 51.1 |
| 14 | −103.60 | | | |

$f_1$: 101.83; $f_2$: 106.13; $f_3$: 101.83;
NA: 0.1
dimension of image plane: 10 $\phi$;
distance between object and image: 361.51;

The arrangements of the lenses corresponding to image-forming magnifications 1.50, 1.00 and 0.67 in this embodiment are shown in TABLE 8.

TABLE 8

| $d_0$ | $d_5$ | $d_9$ | $d_{14}$ | magnification |
|---|---|---|---|---|
| 75.97 | 7.6 | 96.0 | 103.14 | 1.50 |
| 80.55 | 60.8 | 60.8 | 80.55 | 1.00 |
| 104.13 | 96.0 | 7.6 | 75.97 | 0.67 |

Figure 10A:
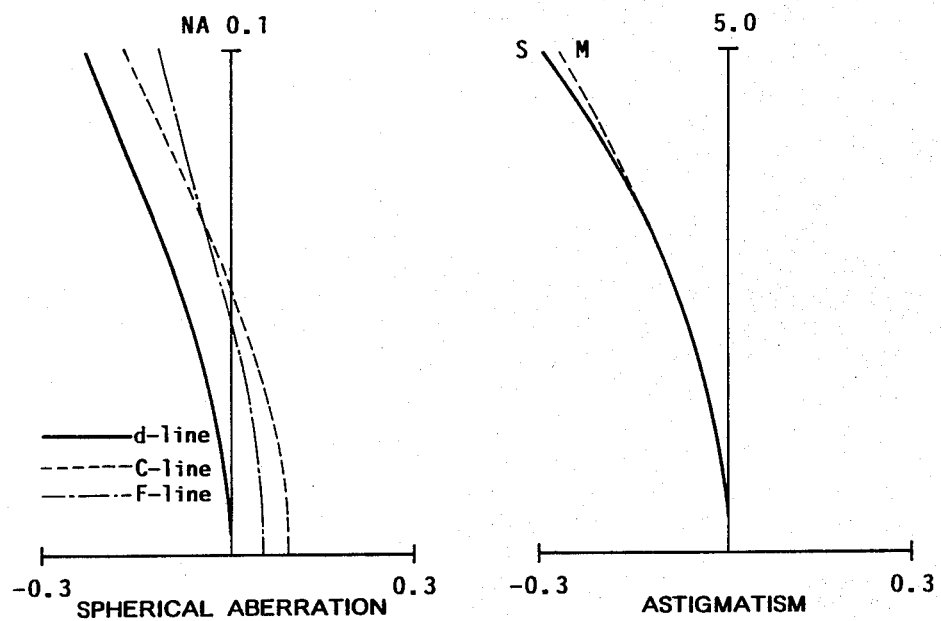
FIGS. 10-(A) through 10-(C) are aberration curves resulting from changes of image-forming magnifications in the fourth embodiment.
Figure 10B:
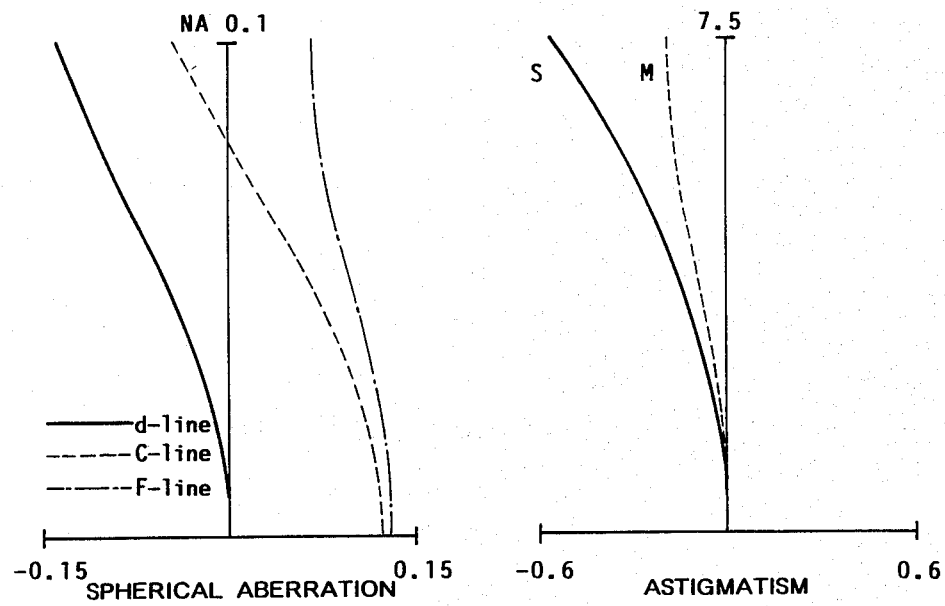
Figure 10C:
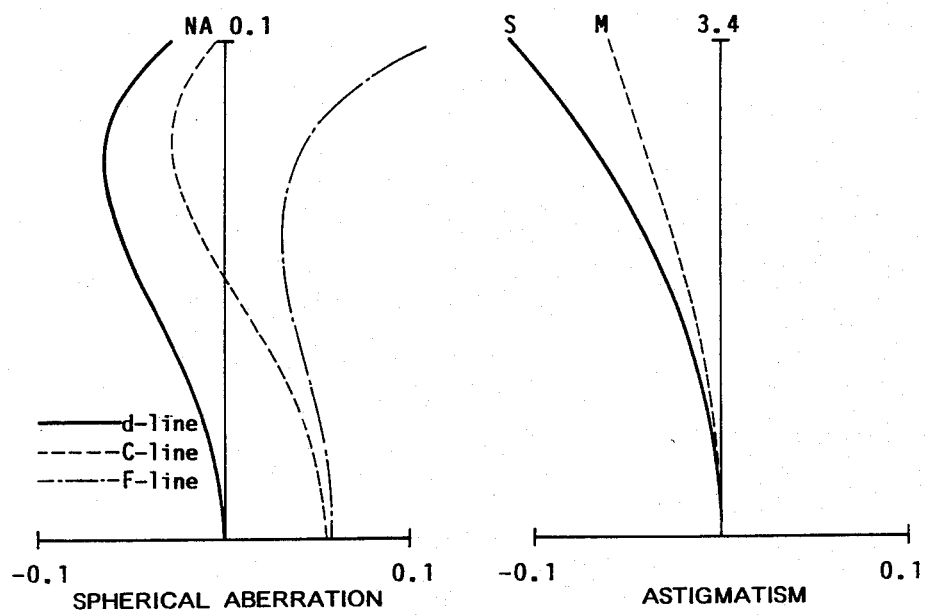

FIGS. 10(A)–10(C) show aberration curves showing the spherical aberration and astigmatism, respectively, with image-forming magnifications of 1.00, 1.50 and 0.67.

In this embodiment, the magnification ratio is 1.50/0.67, namely, 2.24. That is, the telecentric image-forming optical system has a magnification of more than two while maintaining a desired image-forming performance.

In the optical systems described in the first through fourth embodiments, each of the lens groups consists of achromatic lenses as used in normal magnification-varying optical systems.

If these telecentric image-forming optical systems are used as relay lenses within a laser optical system, the second lens group need not consist of achromatic lenses. In practice, the second lens group may consist of a single lens. In this case, an achromatism can be effected by combining the second lens group with the first lens group and the third lens group as necessary.

In each of the above-described embodiments, the focal length of the first lens group is equal to that of the third lens group (reference magnification is 1.00). However, the focal lengths thereof can be varied as necessary. In this case, the reference magnification may be other than 1.00.

In the above-described embodiments, the relationship of the focal lengths of the respective lens groups is $f_1 \simeq f_2 \simeq f_3$. This is because, if the value of $f_2$ is smaller than those of $f_1$ and $f_3$, the curvature of field will become large, which causes the dimension of the effective image plane to be restricted.

The focal length $f_2$ of the second lens group should be long so that the image surface can be flattened and the dimension of the effective image surface can be increased.

Application Example

The telecentric image-forming optical system according to the present invention can be applied to an exposure apparatus such as a laser plotter.

Figure 11:
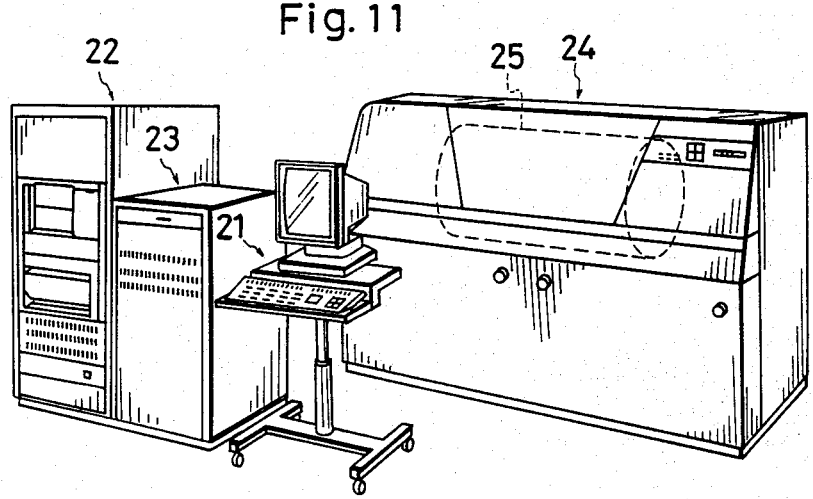
FIG. 11 is a perspective view of a laser plotter system.

FIG. 11 shows an external appearance of a laser plotter system. Such system is currently used for an art work for high speed, highly accurate manufacturing of a photo-mask of a printed wiring board. A cylindrical scanning-type laser plotter as shown in FIG. 11 comprises a console 21, a data processor 23 for processing data inputted from the console 21 or from magnetic tape, a converter 22 for converting processed data into electrical signals, and a recorder for scanning and recording an image on photosensitive film mounted on a cylinder 25 in response to the signals transmitted from the convertor 22.

Figure 12:
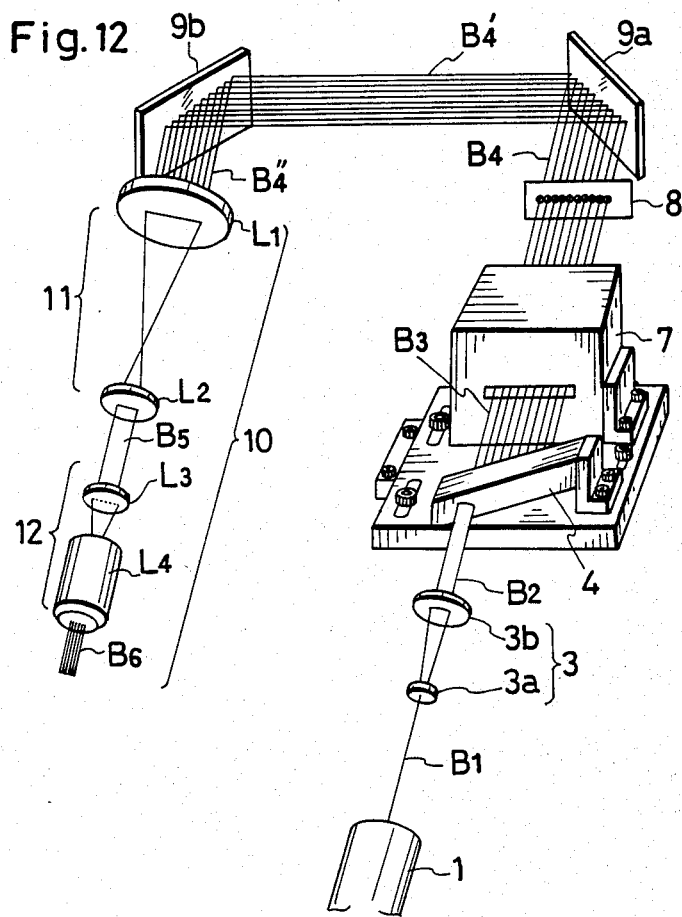
FIG. 12 is a perspective view of a known exposure head of a laser plotter.
Figure 13A:
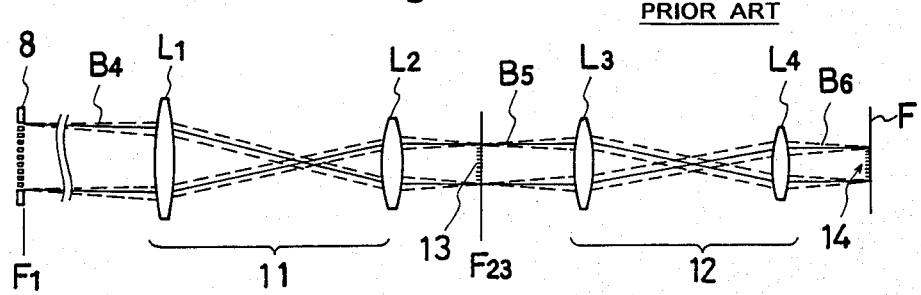
FIG. 13-(A) is a lens construction view showing the telecentric image-forming optical system of the exposure head shown in FIG. 12.
Figure 13B:
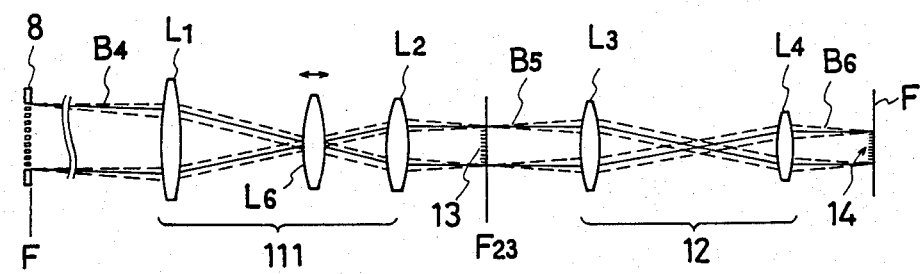
Figure 13C:
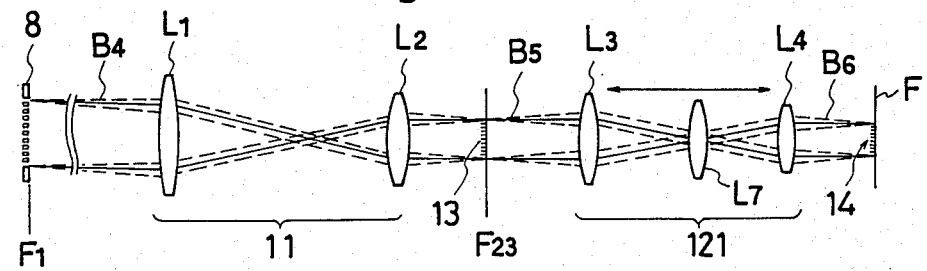
Figure 13D:
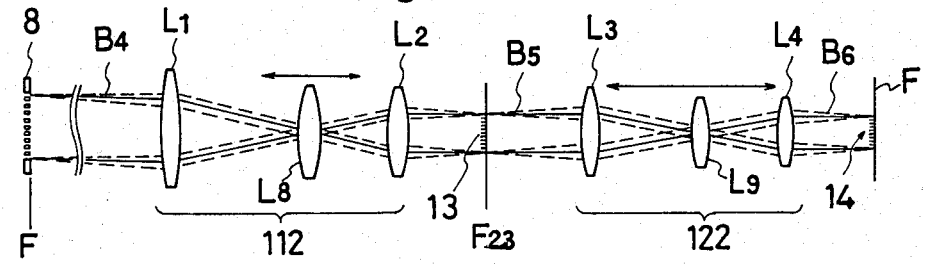

An image is scanned and recorded by an exposure head as shown in FIG. 12. The exposure head moves parallel to the rotation axis of the cylinder 25.

A laser beam $B_1$ emitted from a laser tube 1 has its diameter expanded by a beam expander 3 to become an expanded beam $B_2$. The expander 3 includes lenses $3a$ and $3b$. The beam $B_2$ is divided into a plurality of beams $B_3$ by a beam splitter 4. The beams $B_3$ are modulated by an optical modulator 7 and pass through an aperture plate 8. The beams are then reflected by a first mirror $9a$ and a second mirror $9b$ and then received by an image-forming optical system 10.

The image-forming optical system 10 comprises a first telecentric optical system 11 including lenses $L_1$ and $L_2$ and a second telecentric optical system 12 including lenses $L_3$ and $L_4$. Beams $B_4''$ reflected by the second mirror $9b$ are reduced in width to form beams $B_5$. The beams $B_5$ are relayed by the second telecentric optical system 12 to form beams $B_6$. As a result, an image is reproduced on the film by the beams $B_6$.

FIG. 13-(A) shows a vertical longitudinal sectional view of the prior art image-forming optical system and how light rays advance therein. The image 13 of apertures provided on the aperture plate 8, which is placed at a surface $F_1$, is formed on an image surface $F_{23}$ by the telecentric optical system 11. The image 13 is relayed as an object to an image surface F by the sound telecentric optical system 12 to form an image 14.

FIGS. 13-(B) through 13-(D) are explanatory views showing an image-forming optical system of the present invention to contrast with the system shown in FIG. 13-(A).

At least one of the first telecentric optical system 11 and the second telecentric optical system 12 constitutes a telecentric image-forming optical system comprising three lens groups in accordance with the present invention. According to such a construction, if there is an error in processing or assembling a lens, the error can be compensated for by the second lens groups $L_6$ through $L_9$, whereby a desired image-forming magnification can be obtained. Further, when the image-forming optical system is constructed to have before a magnification of more than twofold by greatly shifting the second lens group, $L_7$ and $L_9$, a course pattern exposure (high speed) or a dense pattern exposure (low speed) can be attained. That is, the intervals between beams $B_6$ can be adjusted.

It is also possible to apply the telecentric image-forming optical system according to the present invention to the beam expander 3 shown in FIG. 12.

Within prior art telecentric image-forming optical systems, magnification generally cannot be varied by changing the object distance and image distance. This makes it difficult to correct a magnification error due to a dimensional error of a lens (such as may occur during processing of the lens). According to the present invention, magnification of a telecentric optical system can be varied—and with a high degree of accuracy.

According to the present invention, a telecentric optical system can have a magnification ratio of more than two. Application of this system to exposure apparatuses such as a laser plotter enables reliable and effective performance regardless of whether exposure is a coarse-finishing or a dense-finishing.

Further, the telecentric optical system according to the present invention is capable of varying a magnification continuously yet the system according to the present invention is different from a conventional zoom lens. In the system according to the present invention, the positions of the entrance pupil and the exit pupil are infinite and do not change. Therefore, if the image-forming optical system according to the present invention is used as a relay lens system, it is easily connected to a subsequent optical system.

While preferred embodiments have been illustrated and described with specificity, the invention should not be limited thereto. Various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A variable telecentric optical system for forming an image of an object, said system comprising:
    a first lens group having a positive focal length $f_1$, a second lens group having a positive focal length $f_2$, and a third lens group having a positive focal length $f_3$, said lens groups being arranged in order along an optical axis, said second lens group being located between said first lens group and said third lens group;
    said third lens group being disposed so that the principal focal point thereof substantially coincides with the secondary focal point of said first lens group;
    said focal lengths satisfying the conditions:

$f_1/2 < f_2$ and $f_3/2 < f_2$;

said second lens group being movable along said optical axis so as to be placeable in the vicinity of the position at which said focal points substantially coincide, whereby the magnification of the system can be varied by moving said second lens group along said optical axis without substantially changing the distance between the object and the image.

2. A system as set forth in claim 13, wherein the distance between the object and the system is fixed.

3. A system as set forth in claim 1, wherein:
said second lens group includes two separate groups; and
the interval between said first lens group and said second lens group and the interval between said third lens group and said second lens group are variable according to the movement of said second lens group.

4. A system as set forth in claim 1, wherein:
(A) said focal lengths satisfy the conditions:

$$f_2 < 2f_1; \text{ and} \qquad (1)$$

$$f_2 < 2f_3; \text{ and} \qquad (2)$$

(B) the composite secondary focal point of said second lens group and said first lens group are movable according to the movement of said second lens group, said third lens group being movable to that the principal focal point thereof coincides with said composite secondary focal point, whereby, when the distance between the object and the first lens group is appropriately selected, a better than twofold magnification is obtainable without moving either the object or the image.

5. A system as set forth in claim 4, wherein the magnification is more than twofold.

6. A system as set forth in claim 1, wherein said focal length $f_1$ is approximately equal to said focal length $f_3$.

7. A system as set forth in claim 6, wherein said focal length $f_2$ is approximately equal to said focal length $f_1$ and said focal length $f_3$.

8. A system as set forth in claim 1, wherein the distance between the system and the image is fixed.

9. A laser exposure apparatus, comprising:
(A) an optical system for forming an image of an object;
(B) means for scanning a photo-sensitive material and recording a desired image thereon by a laser beam modulated by image signals through said optical system;
(C) said optical system being a telecentric optical system and comprising:
(1) a first lens group having a positive focal length $f_1$, a second lens group having a positive focal length $f_2$, and a third lens group having a positive focal length $f_3$, said lens groups being arranged in order along an optical axis, said second lens group being located between said first lens group and said third lens group;
(2) said third lens group being disposed so that the principal focal point thereof substantially coincides with the secondary focal point of said first lens group; said focal lengths satisfying the conditions:

$$f_1/2 < f_2 \text{ and} \qquad (a)$$

$$f_3/2 < f_2; \text{ and} \qquad (b)$$

(3) said second lens group being movable along said optical axis so as to be placeable in the vicinity of the position at which said focal points substantially coincide whereby the magnification of the system can be corrected by slightly moving said second lens group along said optical axis without substantially changing the distance between the object and the image.

10. An apparatus as set forth in claim 9, wherein the apparatus is adapted for use within a laser plotter for producing a photo-mask of a printed wiring board.

11. A laser exposure apparatus, comprising:
(A) an optical system for forming an image of an object;
(B) means for scanning a photo-sensitive material and recording a desired image thereon by a laser beam modulated by image signals through said optical system;
(C) said optical system being a telecentric optical system and comprising:
(1) a first lens group having a positive focal length $f_1$, a second lens group having a positive focal length $f_2$, and a third lens group having a positive focal length $f_3$, said lens groups being arranged in order along an optical axis, said second lens group being located between said first lens group and said third lens group;
(2) said third lens group being disposed so that the principal focal point of said third lens group substantially coincides with the secondary focal point of said first lens group said focal lengths satisfying the conditions:

$$f_1/2 < f_2 < 2f_1; \text{ and} \qquad (a)$$

$$f_3/2 < f_2 < 2f_3; \qquad (b)$$

(3) said second lens group being movable along said optical axis so as to be placeable in the vicinity of the position at which said focal points substantially coincide; the composite secondary focal point of said second lens group and said first lens group being movable according to the movement of said second lens group; said third lens group being movable so that the principal focal point thereof coincides with said composite secondary focal point, whereby, when the distance between the object and the first lens group is appropriately selected, a better than twofold magnification is obtainable without moving either the object or the image.

12. An apparatus as set forth in claim 11, wherein the appratus is adapted for use within a laser plotter for producing a photo-mask of a printed wiring board.

13. An apparatus as set forth in claim 12, wherein the laser plotter is adapted to produce a plurality of beams.

* * * * *